(12) United States Patent
Naffziger

(10) Patent No.: US 7,051,242 B2
(45) Date of Patent: May 23, 2006

(54) METHOD AND APPARATUS FOR IMPROVING YIELD BY DECOMMISSIONING OPTIONAL UNITS ON A CPU DUE TO MANUFACTURING DEFECTS

(75) Inventor: Samuel Naffziger, Fort Collins, CO (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 505 days.

(21) Appl. No.: 10/071,072

(22) Filed: Feb. 8, 2002

(65) Prior Publication Data

US 2003/0154450 A1 Aug. 14, 2003

(51) Int. Cl.
*G06F 11/00* (2006.01)

(52) U.S. Cl. .............. 714/47; 700/121; 716/4

(58) Field of Classification Search .......... 714/3, 714/36, 47; 700/121, 109; 716/4; 324/719; 712/222

See application file for complete search history.

(56) References Cited

U.S. PATENT DOCUMENTS

| | | | | |
|---|---|---|---|---|
| 5,889,679 A | * | 3/1999 | Henry et al. .......... | 716/17 |
| 6,067,633 A | * | 5/2000 | Robbins et al. ........ | 714/1 |
| 6,122,563 A | * | 9/2000 | Beffa .................... | 700/121 |
| 6,133,582 A | * | 10/2000 | Osann et al. .......... | 257/48 |
| 6,694,492 B1 | * | 2/2004 | Shakkarwar ........... | 716/2 |
| 6,697,979 B1 | * | 2/2004 | Vorbach et al. ....... | 714/724 |
| 6,703,573 B1 | * | 3/2004 | Beffa .................... | 209/573 |

OTHER PUBLICATIONS

Microsoft Computer Dictionary, Microsoft Press, 4th Ed., 1999, p. 60.*

* cited by examiner

*Primary Examiner*—Robert Beausoliel
*Assistant Examiner*—Christopher McCarthy

(57) ABSTRACT

A computer processor integrated circuit has multiple functional units, where each unit is coupled to a register file for reading and writing operands. An instruction fetch unit receives instructions from a memory system and dispatches commands to the functional units. The processor has a resource status flags register wherein particular units may be marked enabled or disabled. The instruction fetch and decode unit checks the resource status flags register prior to dispatching commands and dispatches commands only to those functional units marked enabled. The instruction fetch and decode unit is capable of dispatching commands to available units, and of stalling and dispatching remaining commands in a following cycle if insufficient resources are available to simultaneously dispatch all commands necessary to execute an instruction or group of instructions.

9 Claims, 4 Drawing Sheets

METHOD AND APPARATUS FOR IMPROVING YIELD BY DECOMMISSIONING OPTIONAL UNITS ON A CPU DUE TO MANUFACTURING DEFECTS

FIELD OF THE INVENTION

The invention pertains to the field of design and packaging of large, complex, integrated circuits such as processors. In particular, the invention relates to a method of design and packaging CPU integrated circuits so that partially-defective processor circuits may be sold as reduced-performance processor circuits.

BACKGROUND OF THE INVENTION

It is well known in the art of integrated circuits that manufacturing processes are imperfect—on each wafer some, but not all, integrated circuits function fully. It is also known that defects tend to occur in clusters. Therefore, for circuits having multiple, large, functional units, there will be a substantial population of manufactured integrated circuits where one functional unit is defective, or even a small portion of a functional unit is defective, but other functional units on the same integrated circuit function properly.

The probability that an integrated circuit will have one or more defects increases as the size of the integrated circuit increases. Further, the cost of fabrication increases as integrated circuit size increases. A high performance single or multiple-processor integrated circuit can be quite large. It is therefore desirable to find ways of selling at least some of those integrated circuits that contain one or a few defects.

Typically, integrated circuits are tested before they are packaged. Those processor circuits that have defective units are often discarded before packaging; their fabrication cost is wasted but further investment in them is prevented.

Solutions that permit selling partially-defective integrated circuits are known for memory integrated circuits. For example, memory integrated circuits often have spare blocks of memory that can be substituted for defective sections of the circuit. Before spare blocks became common, memory circuits were occasionally packaged with a high-order address bit wirebonded to a constant, then sold as memories of half capacity, with defective sections of the chip disabled. Wirebonding a bondpad to a constant to configure an integrated circuit is known as a bonding option; bonding options may also be implemented through a package trace where a particular package lead is tied to a particular logic level. Bonding the high-order address bit to power or ground permitted sale of packaged circuits having partial capacity, with the same circuit pinout for defects in either the high or low half of the memory array.

Modern integrated processor circuits of high performance are fabricated with at least some cache memory on the processor integrated circuit. Some of these circuits have been designed with bonding options such that a portion of cache may be disabled; a technique that permits product differentiation as well as sale of partially defective circuits. Some of these circuits also have spare blocks of memory that can be substituted for defective sections of cache.

It is known that some available processors have multiples of certain functional units. For example, a processor integrated circuit may have more than one integer execution unit, or more than one floating point execution unit. These units are referenced herein as redundant units. Historically, processors with one defective integer unit, or one defective floating point unit, are typically discarded. Similarly, if multiple processor integrated circuits are sold with a defect in an integer unit or floating point unit of one processor, the entire defective processor is disabled.

It is also known that some processors have functional elements that enhance performance but which are not essential to processor operation. For example, deletion of a branch prediction unit, speculative prefetch unit, or a speculative execution unit may degrade but not kill performance. These functional elements are referenced herein as performance-enhancing units.

Branch prediction and speculative execution are common techniques for minimizing the impact of conditional branch instructions on processor performance.

Branch prediction involves using dedicated hardware to guess whether conditional branches will be taken or not taken. This may be done by tracking recent results of particular conditional branch instructions, and predicting that a particular branch instruction will cause a branch if it caused a branch when it was last executed.

Speculative execution involves a machine's beginning execution of instructions after a conditional branch is encountered in an instruction stream when it is not yet known if the instructions are among those that should be executed. Typically, speculatively executed instruction results are not made permanent until it is determined whether they should have been executed. If instructions are speculatively executed, and it is determined that they should not have been executed, their results are discarded.

Integrated circuit fabrication processes are known that are capable of producing read-only memory cells that can be programmed after wafer fabrication is complete. These processes have been used to create programmable memory devices, programmable logic devices, and other circuits. Processes of this type that use fusible links or laser-burnable links are known. Other processes are known that create programmable cells that are programmed by tunneling charge onto a charge-trapping layer, such as a floating polysilicon gate or an oxide-nitride boundary, in the gate region of a device.

It would be desirable to recover some revenue by using post-fabrication programmable cells to selectively disable defective functional units on processors that have multiples of functional units of those types, and selling the partially defective devices as lower performance processors.

It is also known that different application programs have different processor requirements. For example, some programs have much greater floating point computational requirements than others. Similarly, the percentage of branch instructions may also vary significantly.

Built In Self-Test (BIST) is a design technique wherein circuitry of a functional unit is designed, and some additional circuitry added to the unit, such that the unit can effectively test itself.

SUMMARY OF THE INVENTION

A high performance processor integrated circuit has multiple functional units of various types, including integer execution units, and floating point execution units. The processor is designed and fabricated with programmable cells that may be programmed after wafer fabrication is complete.

When the processor integrated circuit is tested it may be found that one functional unit of a particular type is defective, while one or more functional units of the same type is fully operational. When this occurs, a programmable cell is written to disable the defective unit and reroute all operation needing a unit of that type to the fully operational units of the same type. This is done by programming appropriate bits in a resource status register, thereby allowing the instruction decode and dispatch units of the processor to dispatch operations only to the functional unit or units, while stalling as necessary when more units of a given type are requested than are available.

When the processor integrated circuit is tested it may be also be found that a performance-enhancing element, such as a portion of cache or a branch prediction unit, is defective; while sufficient other units of the circuit function that it may serve as a functional processor of reduced performance. Integrated circuits having these characteristics also have appropriate bits of the resource status register programmed to disable the defective units.

The characteristics of each processor integrated circuit are thereupon compared to a relative performance table. The relative performance table relates defective, disabled, functional units of each integrated circuit to a relative performance level. Those devices having particular performance levels are grouped together and marketed at a lower price than fully functional devices.

DETAILED DESCRIPTION OF THE EMBODIMENTS

Figure 1:
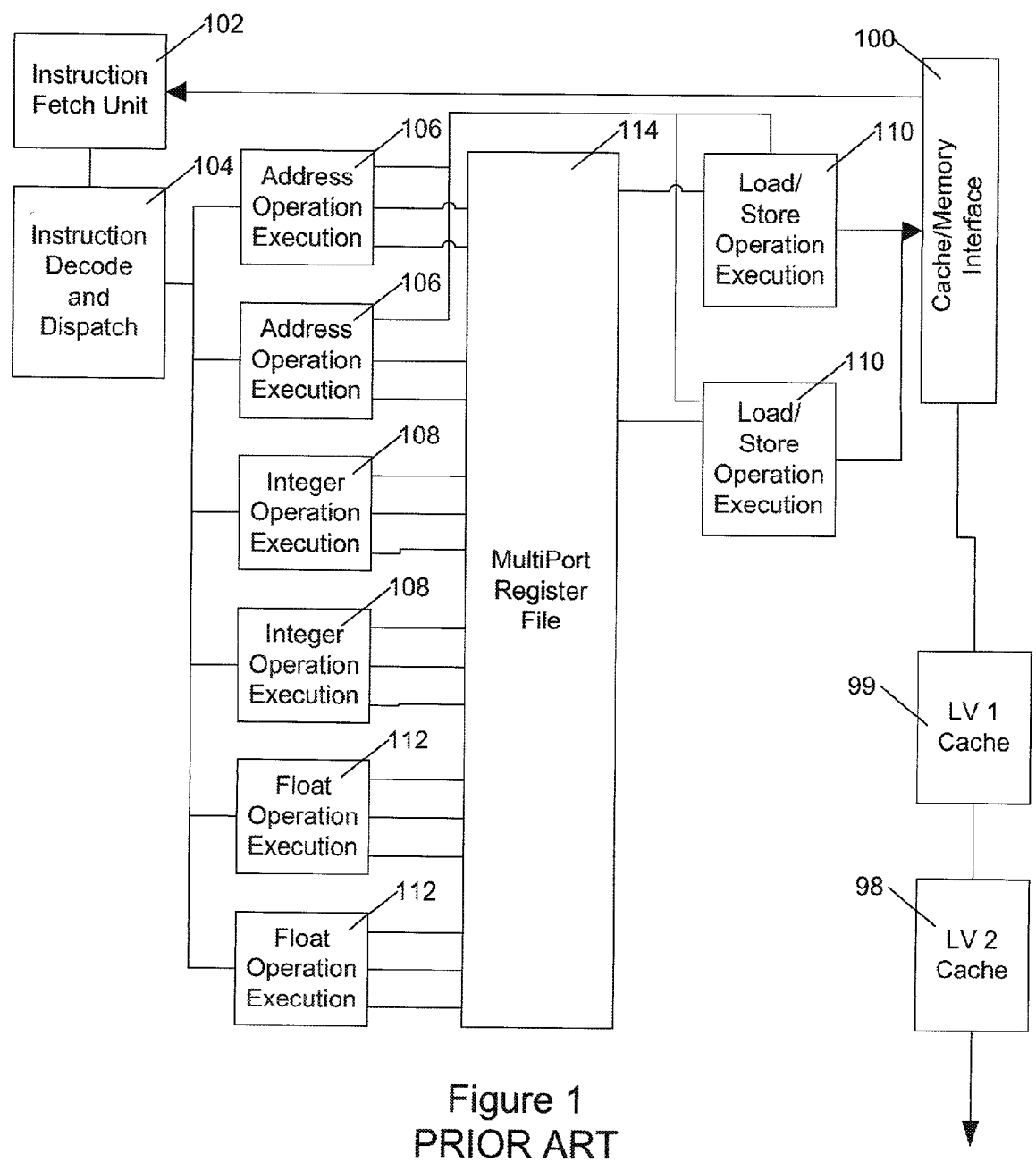
FIG. 1 is a block diagram of portions of a prior art processor.

A processor as known in the art receives instructions from cache 99 and 98 through a cache/memory interface 100 (FIG. 1) into an instruction fetch unit 102. These instructions are decoded in an instruction decode and dispatch unit 104, which then dispatches them to functional units for execution. Address operations are dispatched to address operation execution units 106, integer operations to integer operation execution units 108, load/store operations to load/store operation execution units 110, and floating point operations to floating point execution units 112.

Address operation execution units 106, integer operation execution units 108, load/store operation execution units 110, and floating point execution units 112 fetch their operands and store their results in a multiport register file 114. Multiport register file 114 has a large number of ports, for example in one prior art machine it may have twelve read ports, and eight write ports.

A processor embodying the invention receives instructions from a memory system (not shown), through at least one level of cache 199 (FIG. 2) memory, through a cache/memory interface 200 into an instruction fetch unit 202. These instructions are decoded in an instruction decode and dispatch unit 204, which decodes the instructions to determine the types of functional units required to execute each instruction, the registers referenced by each, and other information. Instruction decode and dispatch unit 204 is associated with a branch prediction unit 205. Instruction decode and dispatch unit 204 then checks a status of each functional unit of a required type in a resource status bits 206 register to determine which resources are available and functional.

In a particular embodiment, the resource status bits 206 register is implemented with programmable memory cells that are programmable at the time of factory test of the integrated circuit on which the processor resides.

The instruction decode and dispatch unit 204 then dispatches commands to functional units marked usable in resource status bits 206 for execution. These commands are those determined necessary to execute instructions decoded by instruction decode and dispatch unit 204. When sufficient resources are not available to fully dispatch one or more instructions, instruction decode and dispatch unit 204 dispatches those portions for which resources are available and stalls, accepting less than a full group of instructions from instruction fetch unit 202 in the next clock cycle. The remaining portions are then dispatched in a following clock cycle.

Address operations are dispatched to address operation execution units 214, integer operations to integer operation execution units 208, load/store operations to load/store operation execution units 210, and floating point operations to floating point execution units 212.

The processor is capable of executing all instructions if one or more functional unit of each type is marked enabled in the resource status bits 206; although performance may be substantially less than with an integrated circuit where all functional units can be enabled. In particular, the processor is capable of executing a mix of integer, floating point, and load/store instructions.

When a conditional branch instruction is encountered, instruction decode and dispatch unit 204 checks to see if branch prediction unit 205 is marked usable in resource status bits 206. If branch prediction unit 205 is marked usable, it is used to determine the most likely result of the branch condition. The most likely code path is then speculatively executed. If branch prediction unit 205 is marked as not usable, the branch prediction unit is not used; a predetermined guess is made as to the most likely code path which is then speculatively executed. In a particular embodiment, when branch prediction unit 205 is nonfunctional it is assumed that all conditional branch instructions will be taken, thereby permitting some speculative execution. Since branch prediction accuracy is degraded, the machine can be expected to waste some processor cycles.

Instruction decode and dispatch unit 204 therefore exhibits degraded performance, but does execute instructions, if at least a minimum subset of functional units are marked usable in resource status bits 206.

The functional units operate upon information stored in, and store results into, register file 228. Load/store functional units 210 are provided for fetching operands from memory into register file 228, and storing results from register file 228 into memory.

Figure 2:
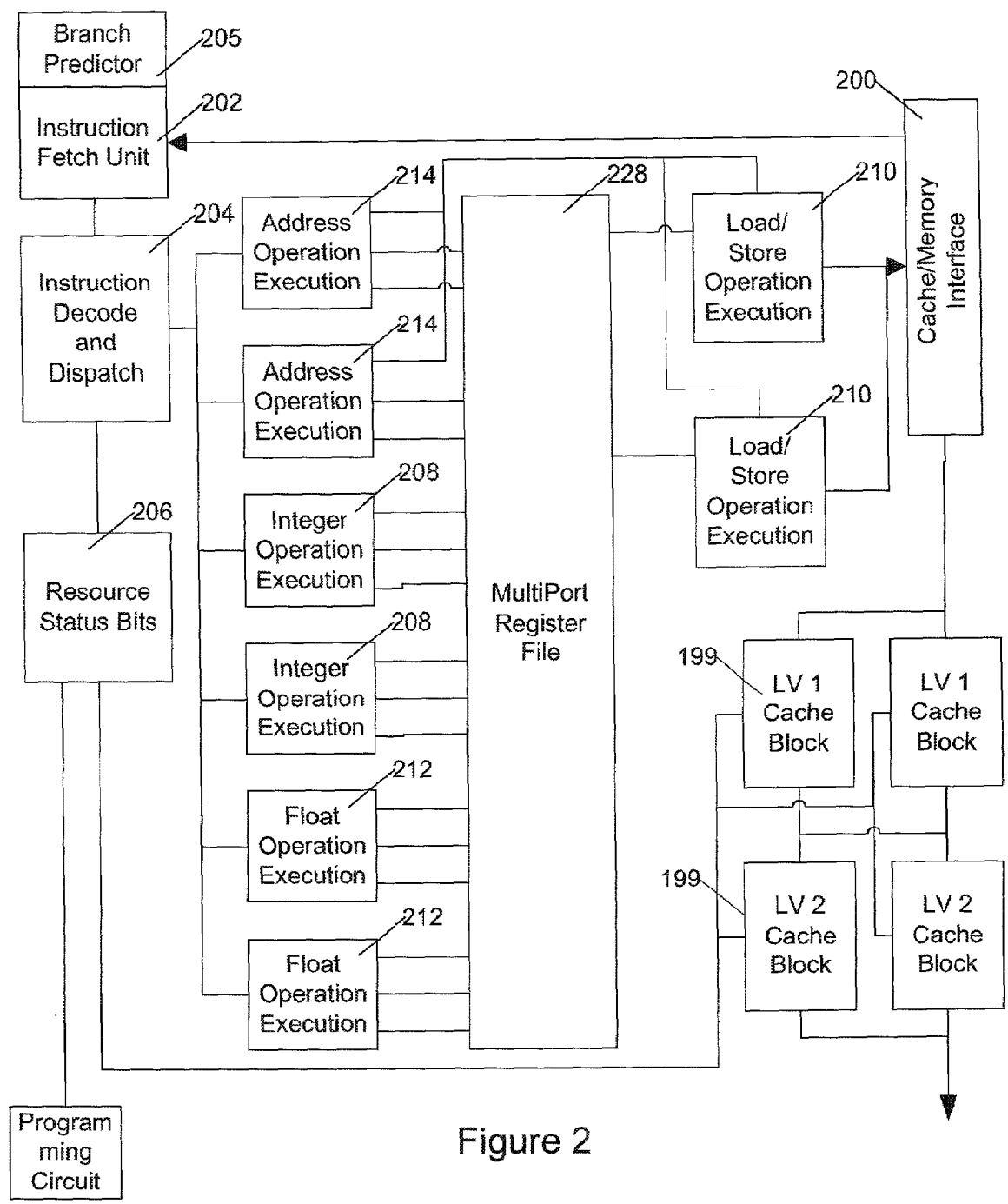
FIG. 2, a block diagram of portions of a processor according to the present invention.
Figure 3:
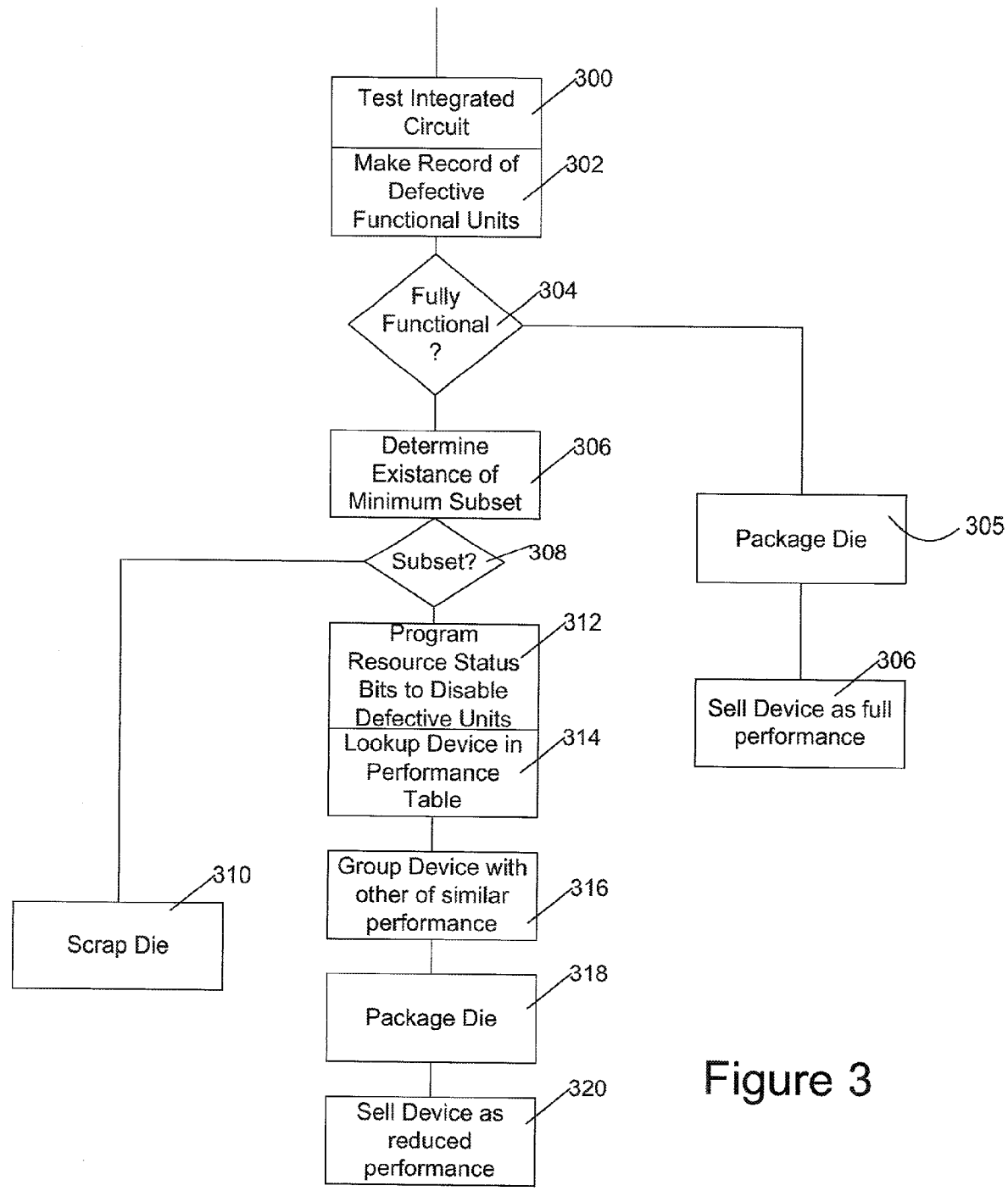
FIG. 3, a flowchart of the method of selling partially defective processor integrated circuits.

After fabrication of the integrated circuits containing processors according to FIG. 2, each processor of integrated circuits is tested 300 (FIG. 3). Testing is as known in the art, where each functional unit is tested, except that a record is kept 302 of defective functional units 208, 210, 212, and 214 identified during testing.

Once testing 300 is complete, the record of defective functional units is examined. If 304 each processor is fully functional, the integrated circuit is packaged 305 and sold 306 as a full performance unit.

The record of defective functional units is also checked to determine whether there is a minimum subset 306 of working functional units. If 308 so many defective functional units have been identified that the integrated circuit can not execute all instructions, even at reduced performance, that integrated circuit is scrapped 310.

The resource status bits 206 are then programmed 312 with information from the record of defective functional units to permanently disable the defective units. Information from the record of defective units is then compared with benchmark results in a performance table 314 to generate a relative performance index, which in an embodiment includes an integer performance subindex and a floating point performance subindex.

The partially defective integrated circuits are then grouped 316 into bins, or classifications, according to their relative performance index. In a particular embodiment, the grouping is performed such that processors having all integer units 208 working, but either one of two floating point 212 units go into a first bin. Similarly, processors having any one integer unit of several integer units 208 defective with all floating point units 212 working go into a second bin. This simplifies marketing since a smaller number of part numbers and prices are required than if parts were marketed according to which exact subset of functional units are defective.

The programmed, partially defective, integrated circuits are then stored until market forecasts indicate that there is a market for them.

When market forecasts indicate that there are likely customers for processors matching their relative performance indexes, the integrated circuits are packaged 318 as known in the art, and sold 320.

In an alternative embodiment, each functional unit is equipped with built-in self-test (BIST) capability; capable of performing at least some testing of the functional unit at boot time. In this embodiment, upon powerup the resource status bits 206 (FIG. 2) are written with results of BIST testing. While BIST at powerup is capable of recognizing many permanent failures resulting from processing defects, BIST alone may fail to recognize voltage and temperature related problems in functional units. In this embodiment, where a logical 1 indicates a unit is not available and a logical 0 indicates that it is available for use, resource status bits 206 may be logically or-ed with information from CMOS battery backup memory, or other nonvolatile memory that need not be located on the processor integrated circuit, during boot time. In this embodiment the nonvolatile memory contains information regarding functional units that must be disabled to ensure operation under all voltage and temperature conditions.

Figure 4:
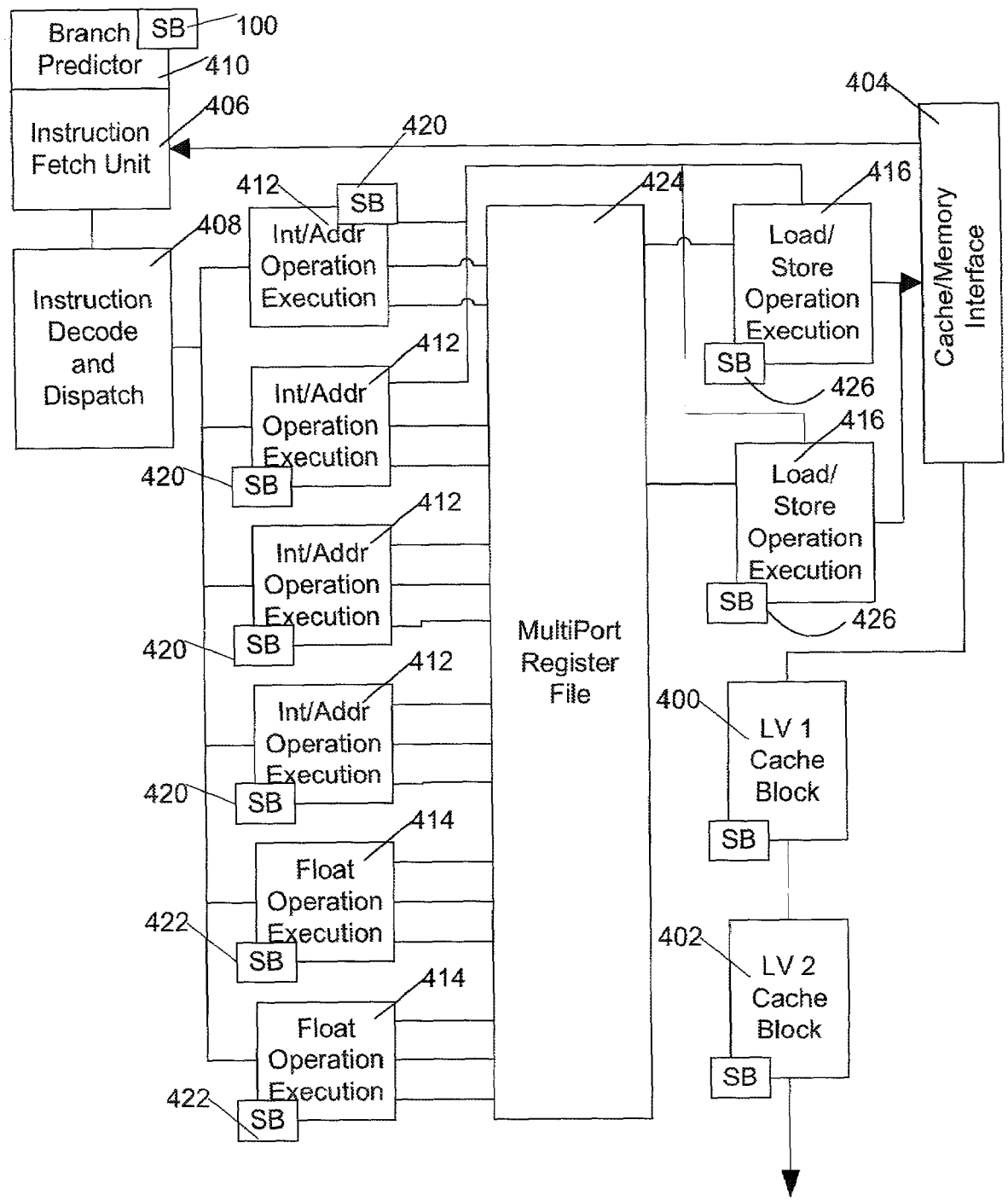
FIG. 4, a block diagram or portions of a processor according to an alternative embodiment.

In another alternative embodiment (FIG. 4), a processor receives instructions from a memory system (not shown), through first 400 and second 402 level cache through cache/memory interface 404 into an instruction fetch unit 406. These instructions are decoded in an instruction decode and dispatch unit 408, which decodes the instructions to determine the types of functional units required to execute each instruction, the registers referenced by each, and other information. Instruction decode and dispatch unit 408 is associated with a branch prediction unit 410. Instruction decode and dispatch unit 408 then dispatches commands to functional units, including integer units 412, floating point execution units 414, and load/store units 416, for execution. These commands are those determined necessary to execute instructions decoded by instruction decode and dispatch unit 408.

Each functional unit is associated with a status bit, such as status bits 420 associated with integer/address units 412. Each time a functional unit, such as integer/address units 412, receives a dispatched command, the functional unit polls its status bit and returns an accept signal or a reject signal to the instruction decode and dispatch unit 408. Each unit returns a reject signal if its status bit indicates that it is disabled, and an accept signal if its status bit indicates that it is enabled. Similarly, floating point units 416 have associated status bits 422; and load/store units 416 have associated status bits 426.

When reject signals are received by the instruction decode and dispatch unit 408, it re-dispatches those portions that were rejected in the following state. It also stalls the instruction stream as required.

Address and integer operations are dispatched to integer/address operation execution units 412, load/store operations to load/store operation execution units 416, and floating point operations to floating point execution units 414. These units operate on operands stored in a register file 424.

In this embodiment, best performance is obtained if instruction decode and dispatch unit 408 has the ability to keep track of those functional units that have rejected commands, and preferentially dispatch commands to those units that have not rejected commands.

In this embodiment, status bits 420, 422, and 426 are set at boot time according to built in self test (BIST) results. These bits are set such that each unit is marked disabled if BIST indicates functional unit failure, and marked enabled if BIST indicates the functional unit is functional.

While the invention has been particularly shown and described with reference to particular embodiments thereof, it will be understood by those skilled in the art that various other changes in the form and details may be made without departing from the spirit and scope of the invention. It is to be understood that various changes may be made in adapting the invention to different embodiments without departing from the broader inventive concepts disclosed herein and comprehended by the claims that follow.

What is claimed is:

1. A method of selling a partially defective processor integrated circuit comprising the steps of:
    providing a plurality of functional units on the integrated circuit, the functional units of functional unit types selected from the group of functional unit types consisting of integer execution units, floating point execution units, branch prediction units, address operation units, and load/store units;
    providing a resource status register wherein functional units of the plurality of functional units may be marked with status selected from the group consisting of enabled and disabled;
    testing the integrated circuit to determine which functional units are defective;
    programming the resource status register to mark defective functional units as disabled and remaining functional units as enabled;
    classifying the integrated circuit into bins according to performance available with the enabled functional units;
    packaging the integrated circuit; and
    selling the integrated circuit as capable of performance appropriate for the bin into which it was classified;
    wherein a functional unit of a functional unit type selected from the group of functional unit types consisting of floating point units, integer operation units, load/store units, and address operation units; may only be marked disabled and the integrated circuit sold if there is at least one remaining non-defective functional unit of the same functional unit type marked enabled.

2. The method of claim 1, wherein the step of classifying is performed by a table lookup, the table having been prepared based upon benchmark results.

3. The method of claim 1 wherein the functional units are of functional unit types selected from the group of functional unit types consisting of a functional unit type selected from the group of functional unit types consisting of floating point units, integer operation units, load/store units, and address operation units.

4. The method of claim 3, wherein at least one defective floating point unit of the plurality of floating point execution units is marked disabled and at least one remaining floating point unit of the plurality of floating point execution units is marked enabled.

5. The method of claim 4, wherein the resource status register is implemented in a programmable read-only memory, and wherein the programmable read-only memory is programmed prior to sale.

6. The method of claim 1, wherein a functional unit of the plurality of functional units is a branch prediction unit, and wherein the branch prediction unit is capable of being disabled through programming the resource status bits.

7. The method of claim 6, wherein at least one defective floating point unit of a plurality of floating point execution units on the partially defective processor integrated circuit is marked disabled and at least one remaining floating point unit of the plurality of floating point execution units is marked enabled.

8. The method of claim 6, wherein the resource status register is implemented in a programmable read-only memory, and wherein the programmable read-only memory is programmed prior to sale.

9. A method of selling a partially defective processor integrated circuit comprising the steps of:
   providing a plurality of functional units on the integrated circuit;
   providing a resource status bit associated with each functional unit wherein each functional unit of the plurality of functional units may be marked with status selected from the group consisting of enabled and disabled;
   testing an integrated circuit to determine which functional units are defective;
   programming the resource status register to mark defective functional units as disabled and remaining functional units as enabled;
   determining a remaining performance by lookup in a performance table to classify the integrated circuit into bins according to performance available with the enabled functional units, the performance table having been prepared based upon benchmark results;
   packaging the integrated circuit; and
   selling the integrated circuit as capable of performance appropriate for the bin into which it was classified;
   wherein the partially defective processor integrated circuit further comprises an instruction decode and dispatch unit, at least one functional unit of the plurality of functional units drives a reject line coupled to the instruction decode and dispatch unit, and wherein when the instruction decode and dispatch unit dispatches an instruction to the at least one functional unit and the functional unit activates the reject line, the instruction decode and dispatch unit re-dispatches the instruction to another functional unit of the plurality of functional units.

* * * * *